United States Patent [19]

Coffing

[11] Patent Number: 4,551,246
[45] Date of Patent: Nov. 5, 1985

[54] FLOTATION APPARATUS UTILIZING A NOVEL FLOC BARRIER AND CURRENT DIVERTING MEANS

[75] Inventor: Samuel F. Coffing, Miami, Fla.

[73] Assignee: International Resources Management, Inc., Coral Gables, Fla.

[21] Appl. No.: 428,773

[22] Filed: Sep. 30, 1982

[51] Int. Cl.$^4$ .............................................. C02F 1/24
[52] U.S. Cl. ................................ 210/221.2; 210/540
[58] Field of Search .............................. 210/705–709, 210/221.1, 221.2, 219, 525, 538, 540, 527

[56] References Cited

U.S. PATENT DOCUMENTS

| | | |
|---|---|---|
| 2,305,929 | 12/1942 | Lund et al. . |
| 3,015,396 | 1/1962 | Quast . |
| 3,015,621 | 1/1962 | Quast . |
| 3,147,221 | 9/1964 | Johnston . |
| 3,161,590 | 12/1964 | Weis et al. . |
| 3,195,727 | 7/1965 | Kibbee . |
| 3,286,844 | 11/1966 | Juell . |
| 3,314,880 | 4/1967 | Rubin . |
| 3,338,419 | 8/1967 | Smith . |
| 3,355,023 | 11/1967 | Foster . |
| 3,400,822 | 9/1968 | McKeown . |
| 3,415,378 | 12/1968 | Fukuda . |
| 3,507,392 | 4/1970 | Weis et al. . |
| 3,627,132 | 12/1971 | Kelly . |
| 3,865,711 | 2/1975 | Anderson . |
| 3,907,672 | 9/1975 | Milne . |
| 4,054,520 | 10/1977 | McGivern .................. 210/221.1 X |
| 4,216,085 | 8/1980 | Chittenden ...................... 210/706 X |
| 4,247,391 | 1/1981 | Lloyd . |
| 4,274,959 | 1/1981 | Roediger . |
| 4,277,334 | 7/1981 | Ruidisch et al. . |
| 4,338,192 | 7/1982 | Krasnoff et al. . |

Primary Examiner—Thomas Wyse
Attorney, Agent, or Firm—Thomas W. Cole

[57] ABSTRACT

The invention generally relates to an improved flotation apparatus and process for purifying a stream of effluent by forming a separable, buoyant floc out of waste matter suspended in the effluent. The improved process and apparatus utilizes a tank for containing an effluent, a skimming means for skimming the buoyant floc out of the tank, and a floc barrier and current diverting means including an inclined, buoyant top wall which is pivotally mounted on the sides of the flotation tank, and a bottom wall having a top edge which is adjacent to the bottom edge of the top wall. The upper portion of the buoyant top wall prevents floc from straying from the floc accumulation region of the tank over to the outlet region of the tank, while the lower portion of the top wall, working in conjunction with the bottom wall, diverts fluid currents which tend to float floc over to the outlet region of the tank. The buoyant top wall pivotally coacts with the skimming paddle of the skimming means to trap floc into the floc accumulation region of the tank.

8 Claims, 8 Drawing Figures

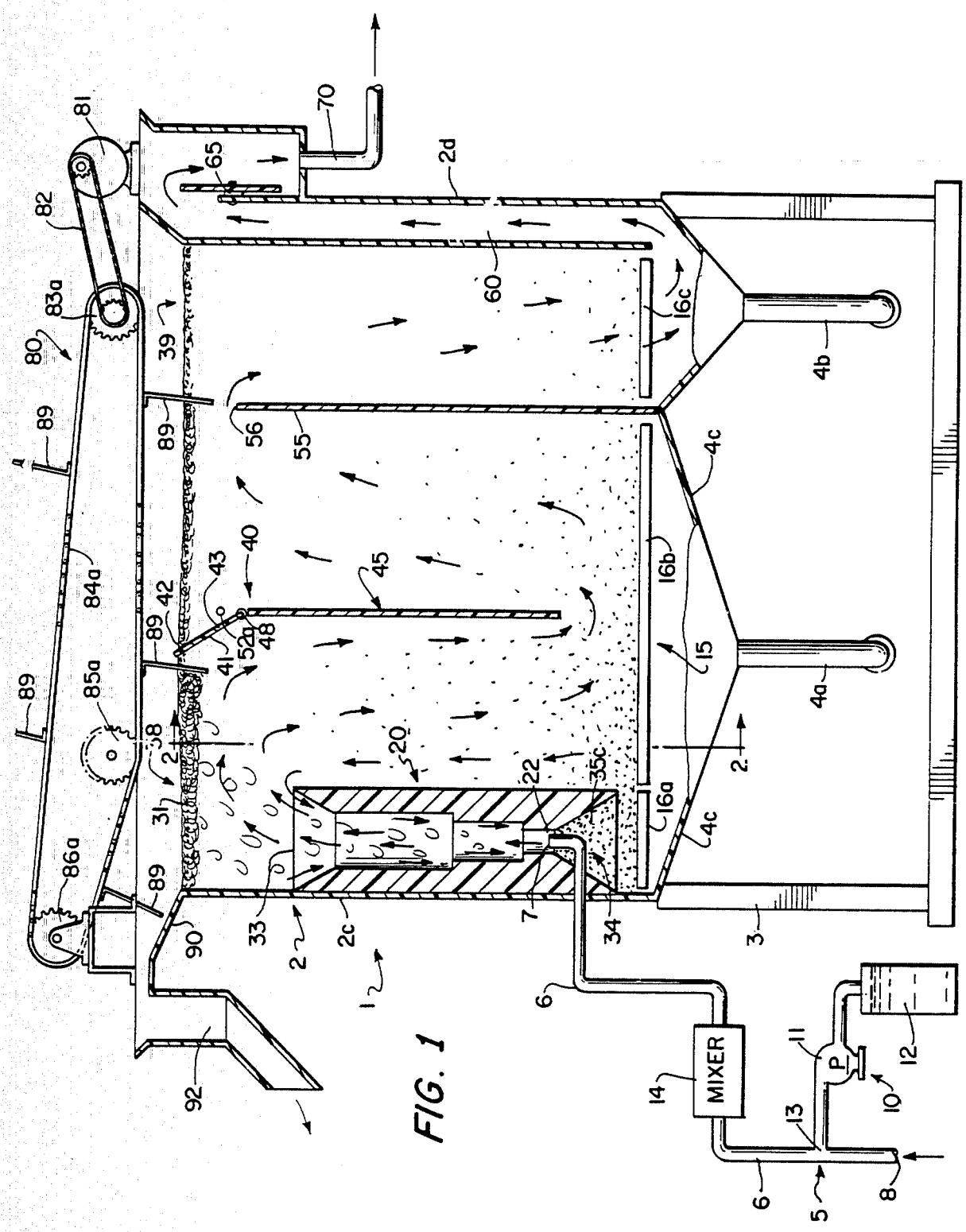

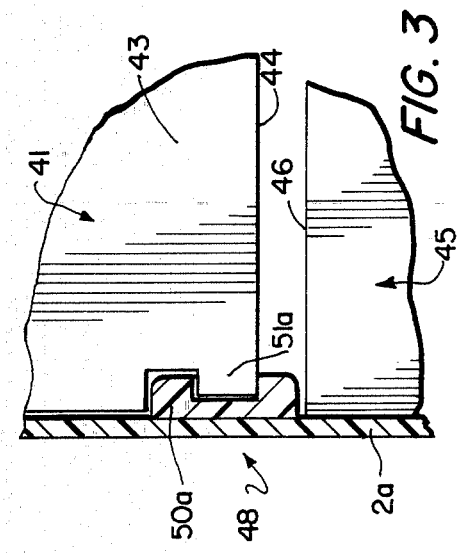
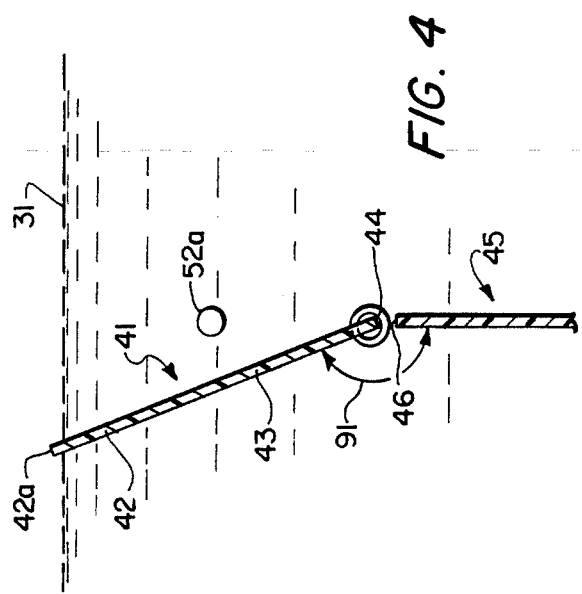
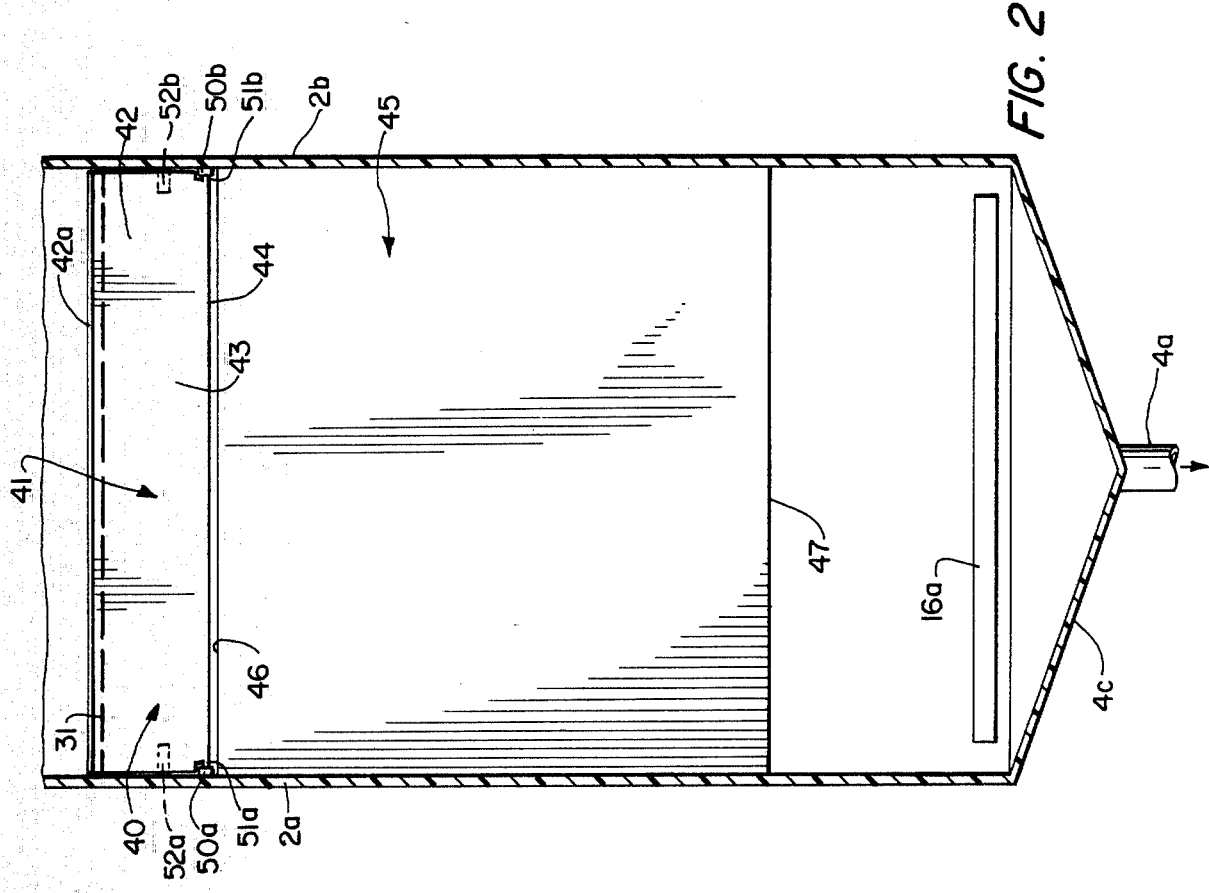
FIG. 3
FIG. 4
FIG. 2

FLOTATION APPARATUS UTILIZING A NOVEL FLOC BARRIER AND CURRENT DIVERTING MEANS

BACKGROUND OF THE INVENTION

1. Field of the Invention

The present invention is generally concerned with an improved flotation apparatus and process for purifying a waste effluent by forming a separable, buoyant floc out of the waste matter suspended in the effluent. The invention utilizes a novel floc barrier and current diverting means in the flotation tank to facilitate the removal of buoyant floc out of the tank.

2. Description of the Prior Art

Purification of waste effluents by flotation devices is well known in the prior art. In general, such devices purify effluents such as waste water by forming a buoyant floc out of the particles suspended in the water. The buoyant floc rises to the surface of the water, where it is skimmed off by an arrangement of skimming paddles. More specifically, the stream of effluent to be treated is first mixed with one or more conditioning agents and then conducted into a flotation tank. In the flotation tank, the effluent and conditioning agent are mixed with a stream or cloud of small bubbles of buoyant gas. The conditioning agent may be a precipitating agent, a coagulating agent, a flocculating agent, or function to change the pH of the effluent. The conditioning agent causes the particles of waste matter suspended in the effluent to flocculate into agglomerates of ever-increasing size. Since this flocculating process is carried out in the presence of the stream or cloud of tiny, buoyant bubbles produced in the flotation tank, some of these bubbles become entrapped in the growing agglomerates of floc. The entrapped bubbles of buoyant gas accordingly render the agglomerates of floc buoyant, and cause them to float up to the surface of the flotation tank. There, the buoyant floc is swept or raked by the paddles of a skimming mechanism into a floc collection area in the tank, where it is ultimately raked out of the tank. The treated effluent flows into a discharge region of the tank, where it flows out through an outlet.

Ideally, a flotation device should be capable of effectively purifying a large volume of effluent in as short a time and as small a volume as possible in order to minimize the expenses associated with both the construction and space requirements of the device. However, one problem which arises when one attempts to increase the effluent-purifying capacity of existing devices has been the tendency for the buoyant floc to stray from the floc collection area of the tank over to the area of the tank where the treated effluent is discharged. Such flocstraying may be caused either by the fluid currents generated by the inflow of the effluent stream into the tank, or by the natural tendency of the buoyant floc to attempt to randomly distribute itself over the surface of the tank, or by both of these effects. Stray floc can mingle with and foul the treated effluent and thereby impair the effectiveness of the device. Thus it would be very advantageous if the flotation device were capable of both quickly and effectively sweeping the buoyant floc toward the floc collection region of the tank, thereby keeping it away from the outlet region of the tank. Such a feature would increase the effluent-purifying capacity of the tank and ensure that only a minimal amount of buoyant floc, if any, would stray into the discharge region of the tank where it could inadvertently be discharged out of the tank along with the purified effluent.

Prior art flotation devices have generally employed an array of chain-driven skimming paddles to sweep the floc into a floc collection region of the tank, where it is in turn raked up a shallow ramp and expelled over the edge of the tank. Such skimming mechanisms generally utilize a plurality of parallel skimming paddles which are continuously moved in the same direction across the tank surface by a pair of parallel chains driven by sprockets. While these mechanisms are generally effective in performing their intended function, they still fall short of an ideal performance. Buoyant floc can still pass under the paddles, leaving some in the outlet region of the tank. If the paddles are simply made deeper in an attempt to solve this problem, they can generate so much surface turbulence in the water that the tiny bubbles entrapped in the agglomerates of floc are shaken out, thereby rendering the floc non-buoyant. Such non-buoyant floc sinks to the bottom of the tank, where it must be removed either by way of a floor raking mechanism, or by way of troublesome and time-consuming maintenance procedures. Furthermore, such mechanisms do not provide a positive means for preventing the floc from straying once it is collected in the floc collection region of the tank. Hence it is possible for the floc collected by the paddles to stray into the purified effluent discharge area. Clearly a need exists for a mechanism which would substantially improve the effectiveness of the skimming operation in flotation devices.

SUMMARY OF THE INVENTION

The instant invention concerns an improved flotation apparatus and process which utilizes a novel floc barrier and current diverting means to substantially improve the effectiveness of the skimming operation in a flotation device. More specifically, the invention comprises an improved flotation apparatus having a treatment tank with a floc collection region where floc is collected prior to disposal, and an outlet region where treated effluent flows out of the tank. The improved flotation apparatus also includes a skimming means having at least one skimming paddle which sweeps the buoyant floc into a floc collection region in the tank, and a floc barrier and current diverting means for preventing floc from straying from the floc collection region of the tank to the outlet region of the tank.

The floc barrier and current diverting means of the invention includes a top barrier wall which is pivotally mounted within the tank between the floc collection region and the outlet region of the tank. The upper portion of this top barrier wall forms a physical barrier which obstructs the floc floating from the collection region to the outlet region of the tank when the top barrier wall is in its normal position. The top barrier wall also has a lower portion which diverts the fluid currents which move the floating floc from the collection region to the outlet region. The top barrier wall may be inclined toward the floc collection area of the tank, and may be formed from a buoyant material so that it is biased in its inclined position as a result of the buoyancy of the material acting against the gravitational force tending to pivot the wall down toward the bottom of the tank.

The top barrier wall may coact with the skimming paddle of the skimming means by pivoting downwardly as the paddle passes over it, and pivoting back up into its floc blocking, inclined position after the paddle completes its passage over the wall, thereby trapping the floc in the floc collection region.

The invention may also include a bottom barrier wall having an upper edge which is adjacent to the lower edge of the top barrier wall for assisting the top barrier wall in diverting fluid currents which would otherwise encourage the floc to stray from the floc collection region.

DESCRIPTION OF THE SEVERAL FIGURES

FIG. 1 is a side, cross-sectional view of the improved flotation apparatus of the invention;

FIG. 2 is a front cross-sectional view of the floc barrier and current diverting means of the invention as it appears in the tank;

FIG. 3 is a detailed drawing of the pivoting means of the invention;

FIG. 4 is a side, cross-sectional view of the floc barrier and current diverting means of the invention as it appears in the tank, and FIGS. 5 though 8 are side, cross-sectional sequential views illustrating how the floc barrier and current diverting means of the invention coacts with the skimming paddles of the skimming means to improve the effectiveness of the skimming operation.

DETAILED DESCRIPTION OF THE PREFERRED EMBODIMENT

Figure 5:
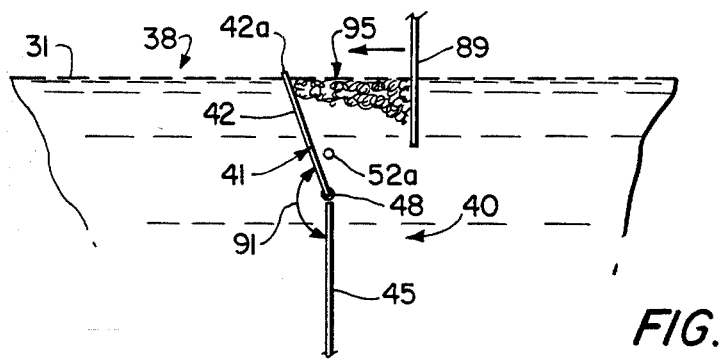

With reference to FIG. 1, wherein like reference numerals designate like parts of the invention in all the other Figures, the preferred embodiment of the flotation apparatus 1 of the invention generally comprises a treatment tank 2 mounted on a frame 3. Treatment tank 2 includes an inlet means 5 for introducing a stream of effluent into the treatment tank 2, a conditioning agent supply means 10 for supplying a stream of at least one conditioning agent to the stream of effluent, a bubble generator 15 for introducing a stream of buoyant gas bubbles into the stream of effluent, and a mixing and floc dispersion means 20. Treatment tank 2 also includes a pair of cleaning drains 4a and 4b for draining the tank and flushing out any non-buoyant floc which might accumulate on the tank floor 4c. Additionally, the tank floor 4c is inclined as shown toward the drains 4a and 4b to facilitate the tank flushing procedure. While the walls 2a, 2b and floor 4c of the tank 2 may be made from almost any type of material, plastic or fiberglass is preferred due to the corrosion resistant properties of such materials. Finally, treatment tank 2 includes a floc accumulation region 38 which is located above the mixing and floc dispersion means 20, and an outlet region 39 which is located in the vicinity of outlet channel 60.

The effluent inlet means 5 includes a conduit 6 having a mouth 7 for introducing a stream of effluent and conditioning agent into the inlet port 22 of the mixing and floc dispersion means 20. The conditioning agent supply means 10 supplies a stream of at least one conditioning agent to untreated effluent flowing into the inlet 8 of inlet conduit 6 to induce the suspended particles in the effluent to flocculate. Conditioning agent supply means includes at least one conditioning agent pump 11 for pumping a conditioning agent from a reservoir 12 directly into conduit 6 at junction 13. If more than one type of conditioning agent is used, a separate pump for pumping each agent is preferred. Inlet conduit 6 preferably includes an in-line fluid mixer 14 between junction 13 and conduit mouth 7 for intimately admixing the conditioning agent with the stream of effluent before the effluent stream is discharged from conduit mouth 7. Again, if more than one conditioning agent is used, the use of a separate in-line mixer for each such agent is preferred. While the means for introducing and admixing a conditioning agent into the effluent inlet conduit 6 forms no part of the instant invention, it should be noted that intimate premixing of a conditioning agent with the stream of untreated effluent before the effluent is introduced into the treatment tank 2 will enhance the effectiveness of the mixing and floc dispersion means 20 in effectively converting the waste particles suspended in the effluent into a uniform layer of buoyant floc which is substantially uniform throughout the width of the tank.

Bubble generator 15 preferably includes three separate electrode groups 16a, 16b and 16c, for producing a stream or cloud of tiny bubbles of buoyant gas via electrolysis. Each electrode group 16a, 16b and 16c is preferably formed from two or more separate electrode assemblies which are arranged and structured so that they generate streams or clouds of bubbles throughout the entire volume of the effluent in the tank 2. An electrolytic means for bubble production is preferred since such methods generally produce smaller bubbles than forced-air methods. Specifically, it is well known that the hydrogen and oxygen bubbles produced by electrolytic methods have diameters typically ranging from 15 to 45 microns, whereas the bubbles produced by forced-air methods have diameters typically ten times greater. Such small bubbles are more easily entrapped into the agglomerates of floc, which in turn enhances the efficiency of the invention. However, it should be noted that the exact device or technique utilized in producing small bubbles forms no part of the instant invention, and that this invention may be practiced with small bubbles produced by any technique.

Mixing and floc dispersion means 20 has an inlet port 22 for receiving the stream of effluent and conditioning agent flowing from mouth 7 of conduit 6. Inlet port 22 also receives a stream of bubbles generated by electrode group 16a of bubble generator 15. The mixing and floc dispersion means includes a pyramidally shaped bubble guide 34 which focuses the bubbles generated by electrode group 16a into inlet port 22 as indicated. The mixing and floc dispersion means 20 functions to intimately admix the streams of effluent, conditioning agent and tiny bubbles in order to convert the suspended particles of waste in the effluent into buoyant floc. Mixing means 20 is preferably situated under the floc accumulation region 38 of the tank as shown, so that the large volume of buoyant floc it generates will naturally float up into the floc accumulation region 38 without any assistance from skimming means 80.

The most preferred embodiment of mixing and floc dispersion means 20 is a separate invention which is described with more specificity in U.S. Pat. No. 4,490,259, issued Dec. 25, 1984, and entitled "Improved Flotation Apparatus and Process Utilizing a Novel Mixing and Floc Dispersion Means" by the inventor, Samuel F. Coffing, the entire drawings and specification of which are hereby expressly incorporated herein by reference. However, it should be noted that the exact device or technique utilized in mixing the streams of effluent, conditioning agent and bubbles forms no part of the instant invention, and that this invention may be practiced with virtually any type of mixing means or method.

Referring to FIGS. 1 and 2, the improved flotation apparatus 1 includes a floc barrier and current diverting means 40 including a top wall 41 having an upper portion 42 for preventing the floc from floating from the floc accumulation region 38 to the outlet region 39 of the tank 2. Top wall 41 also includes a lower portion 43 which diverts the fluid currents generated by the mixing means 20 away from the outlet region 39 and toward the bottom of the tank as shown, thereby impairing these currents from moving the floc in region 38 over to the outlet region 39.

With reference to FIGS. 2 and 3, top wall 41 is pivotally mounted inside the tank via a pivoting means 48. Pivoting means 48 is preferably formed from a pair of opposing sockets 50a, 50b in the side walls 2a, 2b of tank 2, which receive a pair of opposing ears 51a, 51b extending out from the sides and along the bottom edge 44 of the lower portion 43 of top wall 41 as shown. The opposing ears 51a, 51b are preferably formed by recessing the lower portion 43 of the top wall 41 around the sockets 50a, 50b. Such recessing allows the side edges of top wall 41 to come very close to the side walls 2a, 2b of the tank 2, which in turn discourages floc from floating between these side edges and the walls 2a, 2b of the tank 2. It should be noted that pivoting means 48 may be formed from brackets which project up from the top 46 of wall 45, depending on whether the size of the tank warrants the use of two or more adjacent floc barrier and current diverting means 40 across the width of the tank 2.

Top wall 43 is preferably formed from a flexible, plastic material such as polypropylene which is buoyant in water and dimensioned so that the length of top wall 43 is a little longer than the distance between pivoting means 48 and the normal level of the effluent. Such dimensioning causes top wall 41 to float in a position inclined toward floc accumulation region 38 as illustrated, and gently biases it in this position between the gravitational force tending to rotate top wall 41 downwardly about its pivotal mounting, and the buoyancy force tending to rotate top wall 41 upwardly about its pivotal mounting. The preferred angle of inclination of top wall 41 is about 30° from the vertical.

With reference to FIGS. 1 and 4, floc barrier and current diverting means 40 further includes a pair of stop means 52a, 52b which may be formed from a pair of opposing knobs formed on the sides 2a, 2b of tank 2. Stop means 52a, 52b ensure that top wall 41 will not pivot over and incline toward the outlet region 39, but will only incline toward the floc accumulation region 38 as shown. Finally, floc barrier and current diverting means 40 includes a bottom wall 45 having an upper edge 46 which is adjacent to the lower edge 44 of top wall 41. Bottom wall 45 further includes a lower edge 47 under which the effluent being treated in the tank 2 passes on its way to outlet region 39 of the tank 2. Bottom wall 45 assists the top wall 41 in diverting fluid currents which encourage the floc in the floc accumulation region 38 to float toward the outlet region 39, as will be explained in more detail hereafter.

The improved flotation apparatus 1 of the invention also includes another baffle 55 near the outlet region 39 of the tank 2. This baffle 55 encourages the effluent to flow down toward and through electrode assembly 16c. The flotation apparatus 1 of the invention also includes an outlet channel 60. Channel 60 leads to an adjustable weir 65 which determines the fluid level in the treatment tank 2. The construction of adjustable weir 65 is conventional and forms no part of the instant invention. The treatment tank 2 also includes an outlet conduit 70 for conducting the treated effluent out of the tank 2.

Finally, the improved flotation apparatus of the invention also includes a skimming means 80 for removing the buoyant floc produced by mixer 20 and the electrode groups 16a, 16b and 16c from the treatment tank. Skimming means 80 generally includes a drive motor 81, which is connected via drive chain 82 to a sprocket and chain assembly including sprockets 83a and 83b, 85a and 85b, and 86a and 86b, which are mechanically engaged via chains 84a and 84b (sprockets 83b, 85b and 86b, and chain 84b are not shown). Skimming paddles 89 are mechanically attached to the pair of drive chains 84a and 84b and function to rake or sweep the floc generated by mixer 20 off of the surface 31 of the effluent up a ramp 90 where the floc falls down through an outlet chute 92. Skimming means 80 is conventional in structure and forms no part of the instant invention. Applicant notes that similar skimming means are illustrated in U.S. Pat. Nos. 3,959,131, 3,121,680 and 2,813,074. The entire drawings and text of these patents are expressly incorporated herein by reference.

In operation, a stream of effluent is conducted through inlet conduit 6. Pump 11 injects a conditioning agent into inlet conduit 6 at junction 13 from the conditioning agent reservoir 12. In-line mixer 14 functions to intimately admix the effluent with the conditioning agent. The resulting mixture of effluent and conditioning agent flows out of conduit mouth 7. Conduit mouth 7 is concentrically located in inlet port 22, thereby leaving a ring-shaped area between the outside perimeter of conduit mouth 7 and the inside perimeter of inlet port 22. It is through this ring-shaped area that the stream of bubbles produced by electrode group 16a and focussed by pyramidally shaped bubble guide 34 come into contact with the stream of effluent discharged through conduit mouth 7. The bubble stream surrounding the stream of effluent flowing from conduit mouth 7 is pulled up into the inlet port 22 by both the natural buoyancy of the bubbles, and by Bernoulli forces created by the effluent stream.

Mixing and floc dispersion means 20 generates a substantially uniform layer of buoyant floc across the width of tank 2 in floc accumulation region 38, as shown in FIG. 1. Because of the fluid currents generated out of the mouth of mixing means 20 (which are in turn caused by the inflow of effluent and conditioning agent from mouth 7 of conduit 6), as well as the tendency of the buoyant floc to randomly distribute itself over the surface 31 of the effluent, some of the buoyant floc in floc accumulation region 38 would float back or stray toward the outlet region 39 of the tank were it not for the operation of floc barrier and current diverting means 40. The upper portion 42 of top wall 41 effectively blocks the buoyant floc which accumulates in region 38 from floating over toward outlet region 39 as shown. Moreover, because top wall 41 in inclined in the position shown in FIGS. 1 and 4, the floc straying currents generated out from the outlet of mixing means 20 are diverted away from outlet region 39 toward the bottom of the tank 2, as shown. It should be noted that the downward diversion of these currents by top wall 41 also has the advantage of guiding the current of effluent leaving the mouth of mixing means 20 back down into a dense cloud of bubbles generated by the right half of electrode group 16a and the left half of electrode group 16b, so that the effluent flowing out of the mixing means 20 is effectively given a long second exposure to a dense cloud of electrolytically generated bubbles. This, of course, has the effect of further refining the effluent as it flows toward outlet region 39, since the flocculating process continues (albeit at a somewhat slower rate) as the effluent makes its way over to outlet 60 of the tank 2. As is apparent from FIG. 1, the bottom wall 45 of the floc barrier and current diverting means 40 assists top wall 41 in diverting the floc-straying currents away from outlet region 39 and toward the bottom of tank 2.

After the effluent flows around the bottom edge of floc barrier and current diverting means 40, it flows around baffle 55 as shown, and down through electrode group 16c. From there, the effluent flows through outlet channel 60, over weir 65, and out of outlet conduit 70.

FIGS. 5 through 8 illustrate the coaction between the skimming means 80 and the floc barrier and current diverting means 40. While most of the buoyant floc in tank 2 is produced under the floc accumulation region 38 by mixing means 20, some buoyant floc is produced by the bubble streams generated by the right half of electrode group 16a, electrode group 16b, and the electrode group 16c located under the outlet region 39 of the tank 2. Skimming means 80 sweeps substantially the entire length of tank 2 in order to effectively rake off all the buoyant floc on the surface 31 of the tank 2. Hence the blades 89 of skimming means 80 move over the top wall 41 of the floc barrier and current diverting means 40. However, because the top wall 41 is pivotally mounted in tank 2 via pivoting means 48, skimming blade 89, as it approaches top wall 41, with its load of floc preceding it, will simply cause the top wall 41 to pivot downwardly and allow the skimming blade 89 to freely pass over it, while the biasing force caused by the buoyancy of top wall 41 will return top wall 41 to its initial position after the blade 89 passes over it. When the top wall 41 pivots back into its original floc blocking position, the floc deposited into the floc accumulation region 38 by blade 89 is effectively trapped there. While top wall 41 may be biased into the inclined position 91 by any one of a number of other kinds of mechanical means, such as springs, buoyancy is preferred for two reasons. First, buoyancy slightly biases the top wall 41 into the desired inclined position with a minimum of mechanical complexity. This slight biasing of top wall 41 allows it to gently yield to the force applied to it as skimming blade 89 passes over it, so as not to compress the buoyant floc or to create excessive turbulence, which could agitate the bubbles out of the floc and cause the floc to accumulate on the bottom of the tank. Second, the use of buoyancy as a biasing means ensures that the upper portion 42 of top wall 41 will automatically assume an operable position regardless of minor fluctuations in the fluid level of tank 2 which may be made by adjustments of adjustable weir 65.

Figure 6:
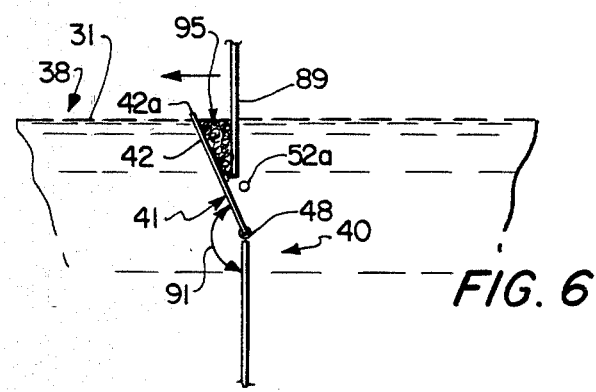
Figure 7:
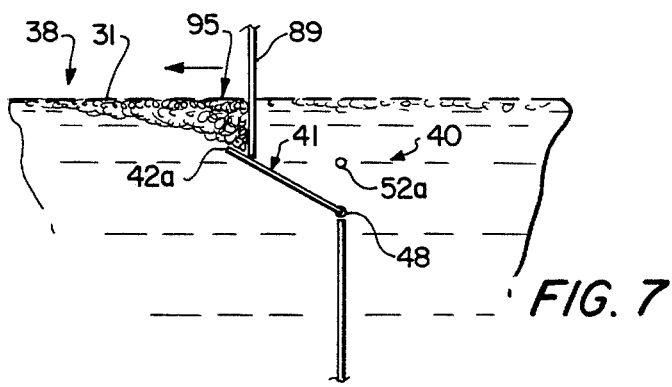
Figure 8:
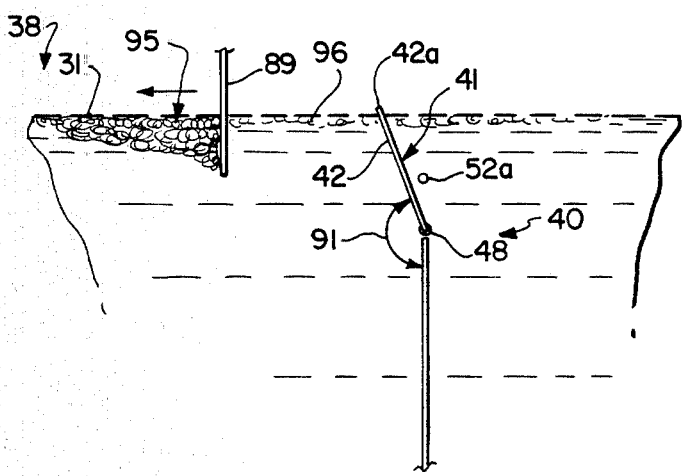

Now that the general operation of the floc barrier and current diverting means 40 has been described, a step-by-step description of the means 40 is appropriate. With specific reference to FIG. 5, skimming blade 89, after skimming over the outlet region 39 of tank 2, approaches the floc barrier and current diverting means 40 with an accumulation of floc 95 in front of it. In FIG. 6, blade 89 makes initial contact with top wall 41. The naturally inclined position 91 of top wall 41 not only serves to deflect floc-straying currents as previously described, but also creates enough space between the blade 89 and top wall 41 so that the floc 95 is not squeezed or agitated to the point where the bubbles entrapped in the floc 95 are freed, thereby rendering the floc 95 non-buoyant. In FIG. 7, skimming blade 89 is shown passing over top wall 41 as top wall 41 pivots downwardly. Since the buoyancy of top wall 41 only slightly biases the wall 41 up into the inclined position shown in FIGS. 5 and 6, this pivoting and blade passing step occurs with a minimum of floc-sinking fluid turbulence and a maximum of mechanical simplicity. Finally, in FIG. 7, the skimming blade 89 has completely passed over top wall 41 and has successfully deposited the floc 95 skimmed from over the outlet region 39 into the floc accumulation region 38. Floc swept into the floc accumulation region 38 is prevented from straying back over into outlet region 39 by the upper edge 42a and upper portion 42 of top wall 41 as shown.

The use of a flexible, plastic sheet material for top wall 41 minimizes the necessity for maintenance or replacement of these particular components of the flotation tank 1. Moreover, the use of such plastic simplifies the mechanical complexity of the device since it allows the opposing ears 51a, 51b of top wall 41 to be easily fitted into the opposing sockets 50a, 50b of the tank walls 2a, 2b by merely bowing top wall 41 slightly along its width, and "snap fitting" it into sockets 50a, 50b.

Although the present invention has been described with reference to a preferred embodiment, it should be understood that the invention is not limited to the details thereof. A number of possible substitutions and modifications have been suggested in the foregoing detailed description, and others will occur to those of ordinary skill in the art. All such substitutions and modifications are intended to fall within the scope of the invention as defined in the appended claims.

What is claimed is:

1. An improved flotation apparatus for treating an effluent by forming a separable buoyant floc out of particles of matter suspended in said effluent, wherein said apparatus is of the type which includes a treatment tank having an outlet on one side where treated effluent flows out of the tank, a floc collection region on an opposing side including a floc outlet where buoyant floc is collected and swept out of the tank, a mixing means for mixing incoming effluent and a stream of bubbles which generates fluid currents in the floc collection region which push the buoyant floc away from the floc collection region and toward the outlet, and a skimming means including at least one blade for sweeping buoyant floc near the surface of the effluent in the tank into the floc collection region in said tank, wherein the improvement comprises a floc barrier and current diverting means disposed between the outlet and the floc collection region including (a) a top barrier wall having a substantially linear cross-section, and an upper edge in close proximity to the surface of the effluent for blocking buoyant floc from moving away from the floc collection region and toward said outlet region in response to said fluid currents, and a lower portion which is movably mounted in said tank for freely yielding to the passage of the blade of said skimming means, wherein said top barrier wall is biased at an incline toward the floc accumulation area in order that it may divert said fluid currents away from said outlet region and toward the bottom of the tank, and (b) a bottom barrier wall having an upper edge which is adjacent the lower edge of the top barrier wall for further diverting said fluid currents away from the outlet and toward the bottom of the tank.

2. An improved flotation apparatus for treating an effluent by forming a separable buoyant floc out of the waste matter suspended in said effluent, wherein said apparatus is of the type which includes a treatment tank having a floc collection region on one side where floc is collected and swept out of the tank, a mixing means located in the floc collection region of the tank which generates fluid currents in the floc collection region which push the buoyant floc away from the floc collection region and toward the outlet, and a skimming means including at least one skimming paddle for sweeping buoyant floc near the surface of the effluent into the floc collection region prior to raking it out of the tank, wherein the improvement comprises a floc barrier and current diverting means disposed between the outlet and the floc collection region including:

a top barrier wall having
  (a) an upper edge in close proximity to the surface of the effluent for preventing said floc from moving away from said floc collection region to said outlet region in response to the fluid currents generated by the mixer;
  (b) a lower portion for diverting said fluid currents away from said outlet and toward the bottom of the tank;
  (c) a mounting means for pivotally mounting said lower portion of said top barrier wall inside said treatment tank so that said top barrier wall freely yields to the passage of the blade of the skimming means, and
  (d) a biasing means for biasing the top barrier wall at an incline toward the floc accumulation area so that it diverts fluid currents away from the outlet and toward the bottom of the tank, and
a bottom barrier wall having an upper edge which is adjacent the lower edge of the top barrier wall for further diverting said fluid currents away from the outlet and toward the bottom of the tank.

3. The improved flotation apparatus defined in claim 2 wherein said top barrier wall is maintained in an inclined position by a biasing force which counteracts the gravitational force on the pivotally mounted top barrier wall.

4. The improved flotation apparatus defined in claim 3 wherein said biasing force is a buoyant force.

5. The improved flotation apparatus defined in claim 6 wherein said top barrier wall is formed from a material which is buoyant in said effluent.

6. The improved flotation apparatus defined in claim 3 wherein said top barrier wall includes a lower edge which is pivotally mounted in said tank via said mounting means.

7. The improved flotation apparatus defined in claim 6 wherein said lower edge is pivotally mounted onto at least one side wall of said tank via said mounting means.

8. The improved flotation apparatus defined in claim 3, wherein said top barrier wall coacts with said skimming paddle as it sweeps over the surface of the effluent being treated in the tank by pivoting downwardly whenever said paddle sweeps over said top barrier wall, thereby allowing said paddle to sweep buoyant floc over the upper portion of said top barrier wall and into said floc collection region while pivoting back to said inclined position when said paddle completes its sweep over said top barrier wall, thereby preventing said floc from floating toward said outlet region.

* * * * *